June 11, 1963   W. J. PICKARD, JR   3,093,129
HEATER

Filed Sept. 6, 1961   2 Sheets-Sheet 1

INVENTOR
W. J. PICKARD, JR.

BY Kimmel & Crowell
ATTORNEYS

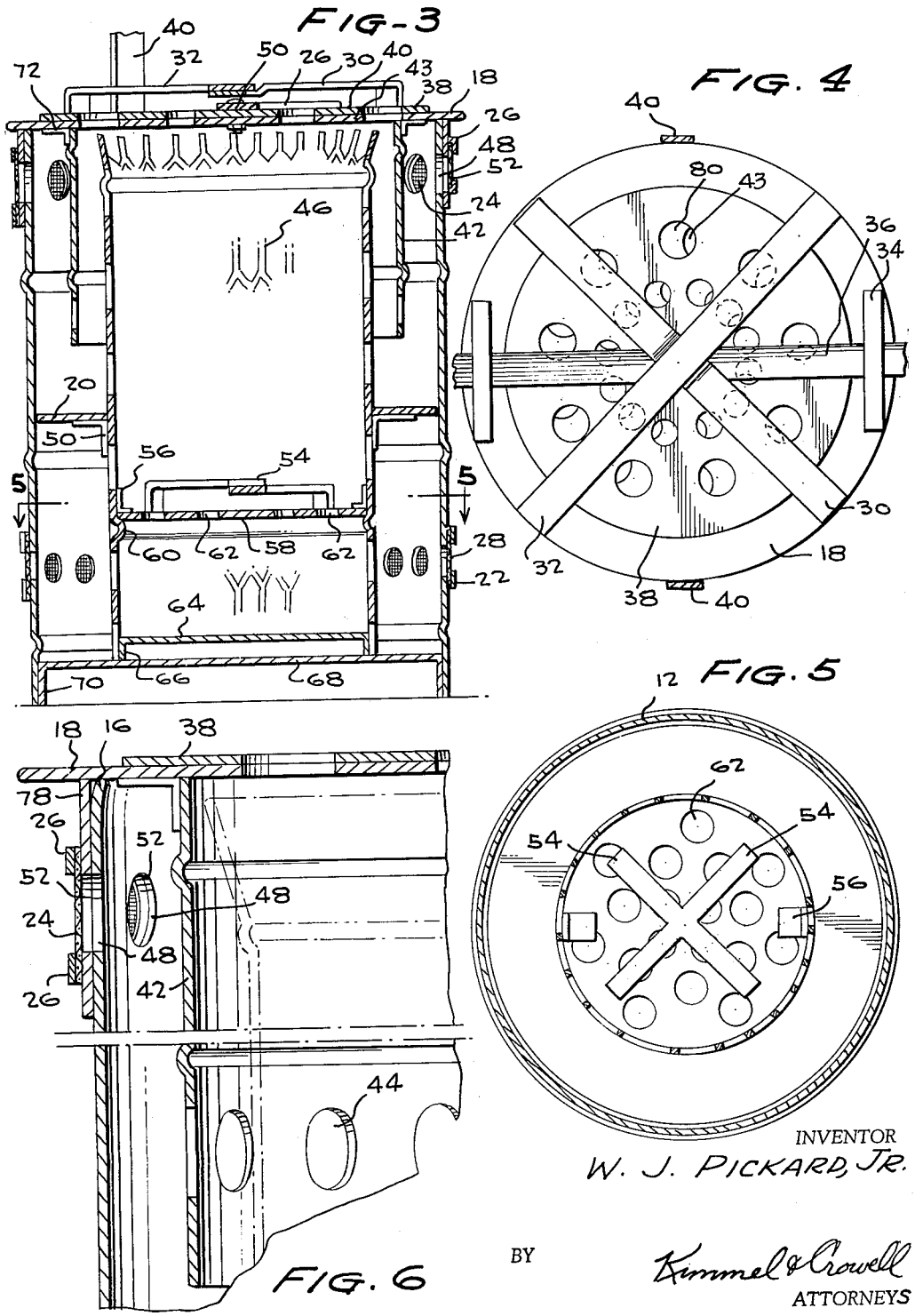

3,093,129
HEATER
William J. Pickard, Jr., 204 Commonwealth Ave.,
Port Wentworth, Ga.
Filed Sept. 6, 1961, Ser. No. 136,238
1 Claim. (Cl. 126—65)

This invention relates to portable heaters adapted to be moved from place to place, with or without a fire therein.

It is an object of this invention to provide a heater of this character with a rotatable top to control the direction of heat emitted therefrom.

It is another object of this invention to provide a charcoal heater with apertures in the sides and top adjustably to control the heat emitted and draft required for operation of the heater.

Still another object of this invention is to provide a heater which is compact, easily movable from place to place, which will provide warmth and at the same time provide heat for maintaining foods or the like in a warm condition.

Still another object resides in providing a device which is extremely simple in construction, therefore readily and cheaply manufactured, and one which is very effective and useful in operation.

With these and other objects in view, the invention comprises novel features of construction, combination and arrangement of parts as will hereinafter be referred to and more particularly pointed out in the specification and claim.

In the accompanying drawings forming a part of this specification:

FIGURE 3 is a sectional view taken substantially along lines 3—3 of FIG. 1 as viewed in the direction of the arrows;

FIGURE 4 is a plan view of the heater;

FIGURE 5 is a sectional view taken along the lines 5—5 of FIG. 3 as viewed in the direction of the arrows; and FIGURE 6 is an enlarged fragmentary sectional view of the rotatable covering mechanism.

Similar reference characters refer to similar parts throughout the several views of the drawing.

Figure 2:
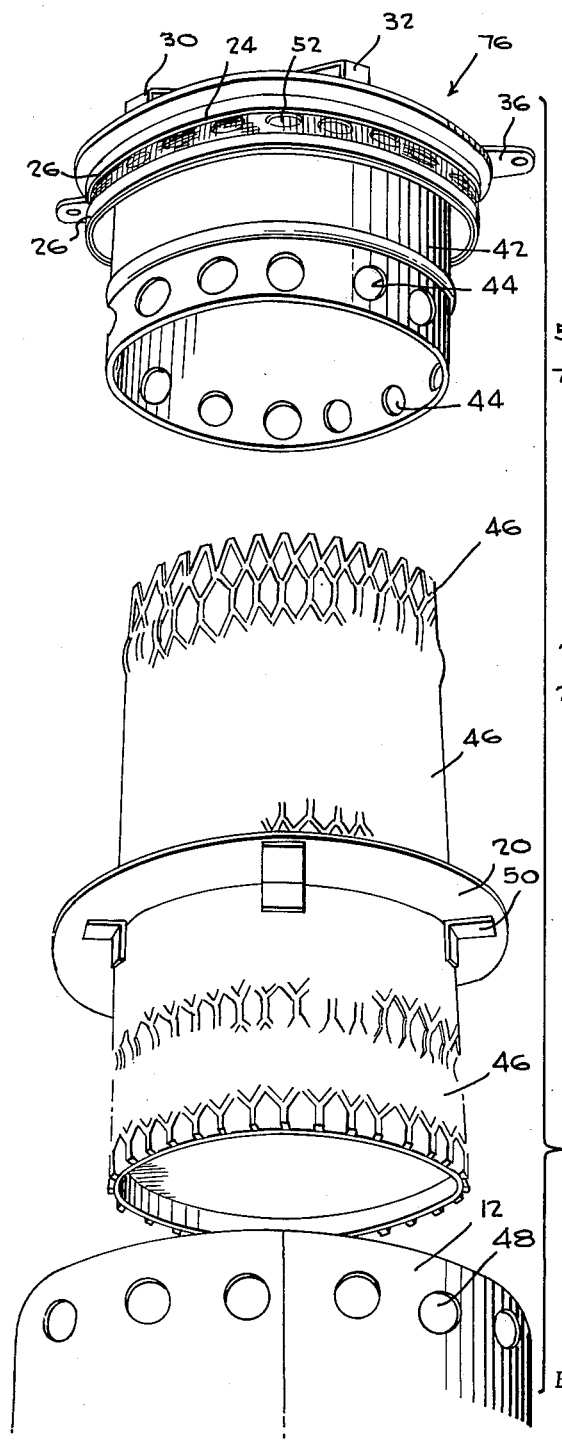
FIGURE 2 is an exploded perspective view of some of the parts of the heater separated for the sake of clarity.
Figure 1:
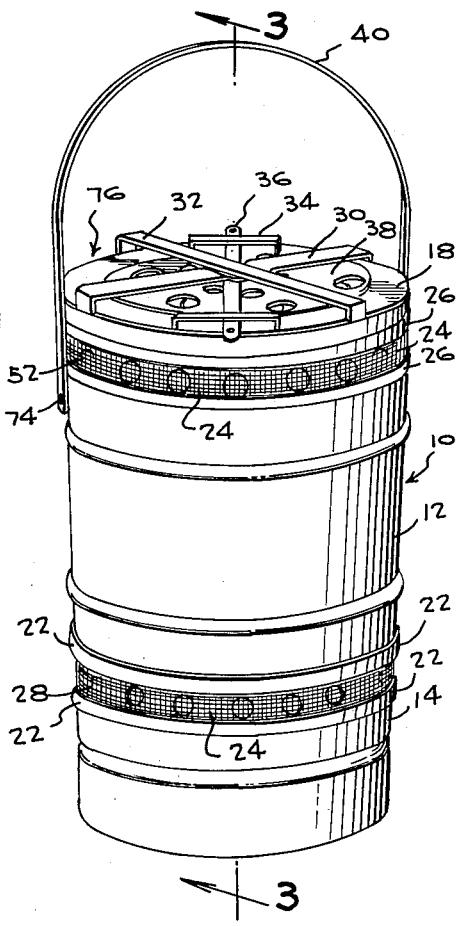
FIGURE 1 is a perspective view of a heater of this invention.

Referring now to the drawing in detail, section 14 is an outer vertical cylindrical shell and is provided with a plurality of spaced apertures or draft openings 28 positioned circumferentially about the burner in a horizontal plane. Covering apertures 28 is a wire screen 24 extending circumferentially about the burner which is maintained in position and secured to the burner by circumferential bands 22 which are spot welded to the bucket. Also provided in the upper section 16 of the bucket is a plurality of similar horizontally spaced apertures or draft openings 48 positioned in such a manner that they will cooperate with similarly provided spaced apertures 52 to be described later. Apertures 52 are covered by a suitable wire screen 24 similar to the screen in the lower section 14 of the burner and similarly is attached to the side walls of lid 76 by means of circumferential bands 26 which are spot welded in the appropriate places to cover the apertures 52.

There is provided a lid for the burner generally indicated by numeral 76 which comprises a top cover plate 18 that covers the entire opening at the upper end of the bucket heater. Mounted near the periphery of cover plate 18 is a circular side wall or annular depending flange 78 which extends downward having the previously described apertures 52 positioned in horizontally thereabout.

Disposed on opposite sides of the upper surface of cover plate 18 is a pair of guide and restraining members or stop means 34. An operator or handle means 36 extends across a top surface of cover plate 18 in such a manner that the ends thereof protrude beyond the sides of the burner. The operator 36 is rigidly attached to disc 38 so that the cover plate may be rotated left to right or from right to left by movement of the ends of operator 36 to vary the size of the heat outlets for a purpose to be described later. Mounted near the periphery of cover plate 18 is a cross member 30 with a depression in the middle portion thereof to receive a corresponding cross member 32, the members being spot welded at their intersection. The cross members 30 and 32 are of sufficiently rigid materials so that they may either serve to assist in pulling the lid assembly 76 off of the burner or act as a support for a kettle or the like placed on top of the heater to be warmed. Member 36 is rigidly secured to rotating disc 38 so that movement of the ends of member 36 to the left or the right will enlarge or reduce the apertures therein which cooperate with corresponding apertures 43 in cover plate 18. A nut and bolt assembly extends through member 36, rotating disc 38, and cover plate 18 to serve as a pivot axis.

Mounted inwardly and spaced from the side wall 78 of the cover assembly 76, is a cylindrical depending wall or inner annular flange 42 which is secured to the underside of cover plate 18 by suitable spot welded L-shaped brackets 72 fixed to the exterior of wall 42 and the underside of cover plate 18. Near the bottom portion of inner wall 42 are a plurality of horizontally spaced apertures 44, which enables the rising heat from the fire to circulate and pass upwardly. It will be noted that the inner annular flange 42 is imperforate over the majority of its length and that the apertures 44 are in a horizontal plane substantially below the apertures 48 in the outer cylindrical shell. It is well known that hot air will rise and without the inner annular flange 42 the rising heat from the fire would tend to go directly upward and out the spaced apertures 48 when the disc 38 and the cover plate 18 are so arranged with respect to each other that a majority of the heat will be directed outwardly through the apertures 48 rather than upwardly through the cover assembly 76. If this device is to be used as a heater it is important that the outer cylindrical shell be heated over a substantial part of its height to increase the effectiveness of its ability to dissipate heat into the surrounding atmosphere. The inner annular flange 42 then acts in the manner of a baffle and directs a majority of the heated air in a tortuous path eventually passing upwardly along the inside wall of the outer cylindrical shell and out through the apertures 48.

There is provided a suitable handle means 40 preferably of sheet metal construction which is attached to the exterior sides of section 16 by suitable rivets 74. A plurality of horizontally spaced apertures 48 are found in the upper portion of the heater which cooperate with corresponding apertures 52 in the side wall 78 of the cover assembly to define a heat outlet. Thus, it is obvious that by mere rotation of the entire top assembly 76 the apertures 52 in wall 78 adjust the size of the outlet or draft from a very small opening to an opening the size of the apertures 48.

Disposed within the interior of heater 10 is a cylindrical shaped screen 46 of rigid construction closed by a plate 64 at the bottom and open at the upper end. Screen 46 has attached thereto on the outer side near the mid-section thereof a flange or annular ring 20, by means of spot welded brackets 50. Flange 20 extends from the screen 46 to the wall 12 of the heater to keep the screen upright. Below the mid-section of screen 46 is a recess 60 which serves as a mounting support for a grate or grill 58 which is maintained in rigid position by brackets 56 space welded to the screen 46, each bracket having a leg attached to screen 46 and its other leg attached to the top side of the grate. Mounted on the top surface of grate 58 are two diagonally disposed charcoal support members 54 spot welded at their intersection upon which supplied charcoal for the burner may be placed. Grate 58 is provided with a plurality of spaced apertures therein so that the ashes and small particles resulting from combustion may pass through to a bottom plate 64 which is flanged downwardly at its periphery and spot welded to screen 46. The screen 46 and the parts therein are supported by a base plate 68 which is mounted upon a circumferential flange 70 positioned internally of the burner. There is thus provided an air space between the surface on which the heater is to be placed and the base plate 68 to eliminate the danger of burning or damaging a surface supporting the heater.

Nearly all the parts of the invention may be constructed of sheet metal and fabricated therefrom.

To prepare the heater for operation, the lid assembly 76 is removed and lifted off of the upright cylindrical heater 10, and a layer of charcoal is spread on the grate 58 and support members 54. Members 54 support the provided charcoal in such a manner that an air space will be maintained between grate 58 and at least some of the charcoal supported by cross members 54. The charcoal disposed within the burner is moistened with a conventional charcoal igniting fluid and then ignited by use of a match or preferably a suitable kindling agent, such as crumpled newspaper or a portion of a wax carton. The holes 23 positioned in the lower section of the burner permit sufficient draft to cause the charcoal to become readily ignited. After the charcoal has become ignited, the heat therefrom will rise upwardly and make its way out of one or both of the provided outlet means while simultaneously heating the walls of the heater. The cover assembly 76 may be rotated as a unit to close or open the apertures in the upper side walls of the heater, or disc 38 with the provided apertures 80 may be rotated to allow the warm air to pass therethrough or rotated in the opposite direction to shut off the corresponding apertures 43 in cover plate 18 so that all the air will be escaped through the apertures in the side wall 78 of the top assembly 76. The cover 18 acts as a deterrent to the passage of heat therethrough thereby permitting the heat to pass out only through the provided apertures therein. Practically no smoke is emitted from the device of this invention.

When the heater has been used for an extensive amount of time and it is desired to clean out the ashes and accumulated particles therein, the lid assembly 76 is removed and lifted off of the heater as is the removable screen 46, so that the heater may be inverted and the ashes and debris accumulated therein may be disposed of.

Since many embodiments may be made of this inventive concept, and since many modifications may be made in the embodiment hereinbefore shown and described, it is to be understood that all matter herein is to be interpreted merely as illustrative, and not in a limiting sense.

I claim:

A portable heater comprising an outer vertical cylindrical shell having an open top and a closed bottom and having a lower row of draft openings positioned circumferentially thereabout and a corresponding upper row of openings adjacent the top thereof, a cylindrical screen positioned interiorly of said shell, said screen having an annular ring extending radially about its midpoint engaging said shell to space said screen from the inner wall of said shell, a grill extending transversely across said screen above said lower row of openings, elevated intersecting charcoal support members secured to the upper surface of said grill, a cover plate having a plurality of openings therein, a disc rotatably mounted on said plate, said disc having a plurality of openings therein correlated with said openings in said plate, handle means for rotating said disc relative to said plate, selectively to vary the effective size of the passages formed by said openings in said plate and disc, an annular depending flange on said plate extending exteriorly of said shell, said flange having a row of circumferentially positioned openings therein aligned and correlated with said upper row of openings, handle means for rotating said plate relative to said shell to selectively vary the effective size of the air passages formed by said top row of openings and said row of openings in said flange, stop means carried by said plate limiting rotative movement of said disc, and an inner annular flange depending from said plate between and spaced from the inner wall of said shell and the wall of said screen, said last-mentioned flange extending substantially below said upper row of openings in said shell and terminating above said annular ring, said annular flange being imperforate at least to a line substantially below said upper row of openings.

References Cited in the file of this patent

UNITED STATES PATENTS

| | | |
|---|---|---|
| 826,705 | Banks | July 24, 1906 |
| 888,109 | Moon | May 19, 1908 |
| 1,160,894 | High et al. | Nov. 16, 1915 |
| 1,213,503 | Krebs | Jan. 23, 1917 |
| 1,345,807 | Panasevitch | July 6, 1920 |
| 1,455,915 | Johnson | May 22, 1923 |
| 1,836,314 | Doran et al. | Dec. 15, 1931 |
| 1,919,407 | Wood | July 25, 1933 |
| 2,614,553 | Cox et al. | Oct. 21, 1952 |